United States Patent [19]

Lundberg et al.

[11] B  4,014,847
[45] Mar. 29, 1977

[54] IONIC POLYMER PLASTICIZED WITH PREFERENTIAL PLASTICIZERS

[75] Inventors: Robert D. Lundberg, Somerville; Henry S. Makowski, Scotch Plains, both of N.J.; Lowell Westerman, Baytown, Tex.

[73] Assignee: Exxon Research and Engineering Company, Linden, N.J.

[22] Filed: July 11, 1974

[21] Appl. No.: 487,467

[44] Published under the second Trial Voluntary Protest Program on April 13, 1976 as document No. B 487,467.

[52] U.S. Cl. .................... 260/33.4 R; 260/30.6 R; 260/30.8 R; 260/30.8 DS; 260/31.8 R; 260/31.8 DR; 260/31.8 G; 260/31.8 W; 260/32.6 R; 260/32.6 A

[51] Int. Cl.$^2$ ................... C08K 5/05; C08K 5/20; C08K 5/43; C08K 5/49

[58] Field of Search ............... 260/30.8 R, 30.6 R, 260/33.4 R, 31.8 R, 32.6 R, 32.6 A, 30.8 DS, 31.8 G, 31.8 DR, 31.8 W

[56]  References Cited

UNITED STATES PATENTS

| | | | |
|---|---|---|---|
| 3,264,272 | 8/1966 | Rees | 260/88.1 R |
| 3,361,702 | 1/1968 | Wartman et al. | 260/30.6 R |
| 3,847,854 | 11/1974 | Canter et al. | 260/31.8 R |

Primary Examiner—Allan Lieberman
Attorney, Agent, or Firm—A. Lagani, Jr.; R. E. Nanfeldt

[57]  ABSTRACT

Ionically crosslinked polymers are plasticized by blending the ionic compositions with a plasticizer which is normally liquid and non-volatile, the plasticizer compounds having a solubility parameter of at least 9.0. The plasticizers are preferential plasticizers for their ionic domains and do not ordinarily plasticize the polymeric backbone.

18 Claims, 4 Drawing Figures

IONIC POLYMER PLASTICIZED WITH PREFERENTIAL PLASTICIZERS

BACKGROUND OF THE INVENTION

Hydrocarbon polymers generally fall into two broad classes, thermoplastic and thermosetting resins. Thermoplastic resins may be readily worked by heating the polymer up to its softening point or melting point. They may then be processed by such deformation methods as vacuum forming, extrusion of a melt, compression molding, etc.

The thermoset resins can generally not be reworked once they have hardened. In general, thermoset resins owe their unique properties to covalent crosslinks between polymer molecules. The crosslinks may be introduced by interaction of various monomers such as copolymerization of styrene in the presence of smaller amounts of divinyl benzene or the reaction of epoxy type resins with polyamines.

Uncured elastomers such as natural rubber and butyl rubber are thermoplastic. They may, however, be crosslinked or vulcanized by the use of sulfur and accelerators which react with the carbon of the unsaturated bonds in the polymer molecules to form in effect a thermoset product which can no longer be fabricated or worked except by machining or similar techniques. The vulcanized polymers have found wide utility because of the significant improvement in physical properties by crosslinking. Natural rubber, for example, may be crosslinked or vulcanized by the use of sulfur which reacts with the carbon of the unsaturated bonds in the polymer molecule to form a bridge between two molecules so that one polymer molecule is covalently bonded to the second molecule. If sufficient crosslinks of this type occur, all molecules are joined in a single giant molecule. Once crosslinked, the polymer is intractable and can no longer be fabricated except possibly by machine. It has, however, significantly improved physical properties. Thus, by vulcanizing rubber, elasticity, tear resistance, flexibility, thermo-mechanical stability and many other properties are either introduced or improved.

A third class of polymers has recently been developed which, although they are crosslinked, have a softening range of temperatures and may even be dissolved in various solvents. At normal use temperatures, these polymers behave similarly to crosslinked polymers. At elevated temperatures, however, they may be deformed and worked in the same manner as thermoplastic resins. Such polymers are said to be physically crosslinked. An example of such materials is ionic hydrocarbon polymers (ionomers). These products owe their unique properties to the fact that crosslinking is accomplished by ionic rather than covalent bonding between molecules of the polymer.

These ionic polymers or ionomers may be readily prepared by a variety of techniques using numerous homo-, co-, and terpolymers as backbones. However, while all ionomers have several obvious advantages, one disadvantage to all is the increased difficulty in processability as compared to similar polymers having the same backbone but without ionomeric crosslinkages.

Polymers containing modest amounts of ionic groups have been commercially available. For the most part, these polymers contain quantities of ionic groups in amounts which vary from about 0.2 mole percent up to about 15 mole percent. In other words, the average ionic group contents of these polymers have generally been about 2 per 1000 monomer repeat units up to about 150 per 1000 monomer repeat units. While those ionomers containing such a level of ionic groups are well known, there has existed some major limitations concerning the nature of the ionic moiety. If the ionic group is a sulfonic acid or a carboxylic acid, it has been previously observed that such polymers cannot be readily fabricated if the acid groups are substantially neutralized. Hence, the presence of about 10 to about 20% of the free acid is required to permit processability of the product.

Naturally, this limitation has precluded the exploitation of those fully neutralized ionomers. Yet, the fully neutralized systems are precisely those which confer the greatest advantage in terms of physical properties and which also are extremely convenient to prepare. Thus, the availability of suitable technology which makes viable the melt processability of such systems is regarded as a significant advance.

It has been demonstrated that certain sulfonated elastomers could be suitably plasticized by addition of selected volatile or high melting, relatively polar species. This plasticization technique disrupts the ionic association and permits fabrication of such elastomers at elevated temperatures. See U.S. application Ser. No. 383,350, now U.S. Pat. No. 3,847,854 filed on July 27, 1973 in the names of N. H. Canter and D. J. Buckley, incorporated herein by reference. That application teaches that the normally liquid polar plasticizers have no utility as such, since they act as plasticizers over the entire temperature range, including the use temperature of the ionomer. Hence, use of such normally liquid plasticizers results in ionomers which lack those physical characteristics for which ionic domains were introduced into the polymer initially.

SUMMARY OF THE INVENTION

It has surprisingly been found that certain classes of non-volatile, normally liquid compounds are effective in providing controlled levels of preferential plasticization of ionically crosslinked polymers at elevated temperatures, while at the same time interfering only negligibly with ionic association at normal use temperatures for the ionically crosslinked polymer.

The useful liquid plasticizers of this invention have solubility parameters of at least 9, boiling points of at least 150°C. and contain functional groups exhibiting a polarity of at least 0.6 Debye.

DETAILED DESCRIPTION

This invention relates to a method of rendering ionomers processable by incorporating therein a plasticizer which preferentially disrupts the ionic domains without affecting the polymer backbone. In particular, this invention relates to a method for plasticizing ionomers using as the preferential plasticizer normally liquid, non-volatile polar compounds having solubility parameters of at least 9 and which contain functional groups having a polarity of at least 0.6 Debye.

The term "non-volatile" as used in the specification and claims means those materials having a normal boiling point of at least 150°C. The term "normally liquid" as used in the specification and claims means those compounds which are in the liquid state at ambient temperatures.

The preferred plasticizers of choice for use in the practice of this invention have solubility parameters of at least 10.0 and boiling points of at least 200°C. These compounds contain polar groups which exhibit a polarity of at least 1.0 Debye. Illustrative of the compounds which fit these criteria are alcohols, such as glycerol, ethylene glycol, butane diol, etc. Such alcohols are particularly effective in disrupting the ionic associations at elevated temperatures. Other suitable plasticizers having solubility parameters within the scope of this invention are dibutyl phthalate, 9.3; dipropyl phthalate, 9.7; hexamethyl phosphoramide, 10.5; N-ethyl toluene sulfonamide, 11.9; N,N-dimethylacetamide, 10.8; 2,2-dimethyl-1,2-ethanediol, 11.2; and dimethyl sulfoxide, 12.0. It will be obvious to those skilled in the art that this is only a partial listing of suitable plasticizers. Those skilled in the art may readily select useful plasticizers utilizing tables of solubility parameters, freezing points and boiling points for compounds. Hence, by selecting compounds which have freezing points below ambient temperatures, a class of normally liquid compounds will be defined. By selecting those compounds out of among the normally liquid compounds which have boiling points above about 150°C., the list of compounds is reduced to that class of normally liquid non-volatile compounds. This list may be further reduced to the useful plasticizers of this invention by selecting those compounds which exhibit solubility parameters of at least 9.0, more preferably at least 10.0.

The term "ionomer" as used in the specification and claims means those polymers which are crosslinked by ionic bonding. Elastomers which fit into this definition of ionomers are described in U.S. Pat. No. 3,642,728, incorporated herein by reference; those ionomers being sulfonic acid ionomers. Other suitable ionomers are carboxylate and phosphonate ionomers. It has been found that the physical properties of the ionomers are a function of the nature of the ionic group, the ionomers of strong acids being the preferred ionomers. Hence, sulfonates and phosphonates are preferred to carboxylates. The sulfonates are particularly preferred because of their ease of manufacture. On the other hand, the phosphonates tend to be more stable in their acid form. The ionomers may be either elastomers or plastics. In all cases, the ionic groups of the ionomers are substantially neutralized. As used in the specification and claims, the term "substantially neutralized" means that at least 95% of the acid groups of the ionomer are neutralized.

This invention is not intended to be limited by the manner of preparation or the type of ionomer. Methods of neutralization of ionomers are well known in the art. See, for example, U.S. Pat. No. 3,642,728.

Illustrative examples of methods of preparation of ionomers are set forth below.

A. Copolymerization with Sulfonate Containing Monomers

Alkali metal salts of styrene sulfonic acid may be copolymerized using free radical initiators with a variety of vinyl aromatic compounds such as styrene, t-butyl styrene, chlorostyrene, etc.

B. Direct Sulfonation of Homopolymers

Sulfonic acid groups may be introduced into aromatic polymers such as polystyrene, polyvinyl toluene, polyalpha-methyl styrene, poly-t-butyl styrene, and copolymers of styrene, vinyl toluene, alpha-methyl styrene or t-butyl styrene by direct reaction with a sulfonating agent. Although sulfonating agents such as sulfuric acid and chlorosulfonic acid may be used, the preferred sulfonating agents are sulfur trioxide donors in conjunction with a Lewis base and certain acylsulfates, e.g., acetyl sulfate. See, for example, the methods taught in U.S. Pat. No. 3,642,728. The preferred Lewis bases are dioxane, tetrahydrofuran, and trialkyl phosphates. The preferred ratio of trialkyl phosphate to sulfur trioxide donor ($SO_3$, sulfonic acid, etc.) is about 1.0.

C. Direct Sulfonation of Modified Polymers

Where desirable homopolymers cannot be readily reacted to produce sulfonate containing materials, it is possible to introduce by copolymerization functional groups capable of reacting with sulfonating agents. The most desirable functional groups for this purpose are sites of olefinic unsaturation and aromatic groups, especially phenyl groups.

1. Copolymers of Aromatic Monomers

Copolymerization of vinyl monomers and relatively small amounts of styrene or other vinyl aromatics reactive to sulfonating agents produces copolymers with essentially homopolymeric properties capable of being sulfonated. Such copolymers might be chlorostyrene-styrene, styrene-acrylonitrile, styrene-vinyl acetate, etc. In non-vinylic polymer systems, an aromatic group may be introduced into the polymer through the use of an aromatic containing monomer, for example, phenyl glycidyl ether copolymerized with propylene oxide. The aromatic monomer is incorporated into the polymer at about the same level as the sulfonation of the ionomer. The reagents suitable for introducing sulfonic acid groups directly are the same as those described in B above.

2. Polymers Containing Unsaturation

Although unsaturation may be introduced into homopolymers in numerous ways, copolymerization with a conjugated diolefin generally can be relied upon to produce thermoplastic or elastomeric materials containing small amounts of unsaturation. For example, unsaturation may be introduced into polyisobutylene by copolymerization with a conjugated diolefin such as isoprene or cyclopentadiene. Unsaturation may be introduced into ethylene-propylene rubbers by copolymerization with non-conjugated diolefins such as ethylidene norbornene or 1,5-hexadiene. Methods of polymerization are well known in the art. In polyethers, unsaturation can be introduced by copolymerization with unsaturated epoxides, e.g., allyl glycidyl ether.

The reagents which are suitable for direct introduction of sulfonic acid groups into unsaturated thermoplastics are the complexes of $SO_3$ with Lewis bases and certain acyl sulfates. The Lewis bases include dioxane, tetrahydrofuran, trialkyl phosphates, trialkylamines and pyridine. Particularly preferred acyl sulfates are acetyl sulfate, propionyl sulfate, and butyryl sulfate.

D. Oxidation of Sulfur Containing Functional Groups

Polymers which contain sulfinic acid groups can be readily air oxidized to sulfonic acid. Polymers containing mercapto groups can be easily converted through oxidation of the mercapto group with a variety of oxidation agents such as hydrogen peroxide, potassium permanganate, sodium dichromate, etc. Hence, it is apparent that there are virtually unlimited methods of producing ionomers suitable for use in the practice of this invention which, when plasticized by the preferential plasticization of this invention, are readily processed at conventional processing temperatures.

Methods of producing carboxylic acid containing ionomers are well known in the art. See, for example, U.S. Pat. No. 3,322,734. Methods of preparing phosphonate ionomers are taught in U.S. application Ser. No. 301,969, now abandoned, incorporated herein by reference.

The base polymers of this invention, i.e. the thermoplastics and elastomers devoid of ionic functionality, are those polymers having average molecular weight from about 5,000 to 2,000,000, preferably from about 20,000 to about 500,000. The base polymers can be prepared directly by any known polymerization process or they can be obtained by a modification of another polymer, e.g., hydrogenation of butadiene-styrene copolymers. The term "ionomer" as used in the specification and claims means ionically crosslinked polymers.

The introduction of sulfonic acid groups into the base polymer must be sufficient to provide for ionic interaction between the polymer chains. However, since the sulfonic acids do not possess high thermostability and since the salts of sulfonic acids are considerably more ionic than the acid, it is especially preferred to convert the sulfonic acid to the metal salt. For the purposes of this invention, the sulfonic acid group must be substantially neutralized. Preferably, the salts are prepared from the metals in Groups IA, IIA, IB and IIB of the Periodic Table of the Elements and lead, tin and antimony. Most preferably the salts are those of sodium, potassium and barium. Other neutralizing agents such as amines, e.g., ethylamine, trimethylamine, etc., may be utilized. See, for example, U.S. Pat. No. 3,642,728 having a broad disclosure of neutralizing agents.

A wide variety of properties can be obtained through variations of the base polymers, the sulfonate level, the type of metal salt and the type and level of plasticizer. Only small amounts of sulfonate are necessary to impart desirable properties into the ionomer. For example, the ionomer may contain 0.2 to about 10 mole percent sulfonate, preferably about 0.5 to about 6 mole percent, more preferably about 1.0 to about 4 mole percent. Below 0.2 mole percent, very little improvement in physical properties is noted. Above 10 mole percent, the polymers tend to become water sensitive. The term "mole percent sulfonation" as used in the specification and claims is intended to mean the number of sulfonate groups present per 100 monomer units of the polymer.

It is appropriate to emphasize that non-volatile liquids widely regarded as plasticizers for certain polymers which do not meet the requirements of the definition of the non-volatile preferential plasticizers of this invention are ineffective for the purposes of the invention. For example, dioctyl phthalate is widely regarded as a very effective plasticizer for polyvinyl chloride. However, due to its low polarity, it is unsuitable for use in the present invention. In this regard, the results obtained are unexpected, and it will be apparent the polarity and solubility parameters are critical aspects of the preferential plasticizer. Similarly, such polar non-volatile liquids as glycerol are not normally regarded as effective plasticizers for plastics generally. However, for the purposes of this invention, it is a preferred effective preferential plasticizer of the ionic domains.

The amount of preferential plasticizer employed in this invention ranges from about 0.2 parts up to 50 parts preferential plasticizer per 100 parts of ionically crosslinked polymer, preferably from 0.5 parts up to 25 parts per 100 parts of ionic polymer, most preferably about 1 part to about 20 parts per 100 parts of ionically crosslinked polymer.

The term "preferential plasticizer" as used in the specification and claims means those plasticizers which preferentially disrupt ionic domains.

FIG. 1 describes the influence of various plasticizers on ionomer melt viscosity at 220° C.

Figure 1:
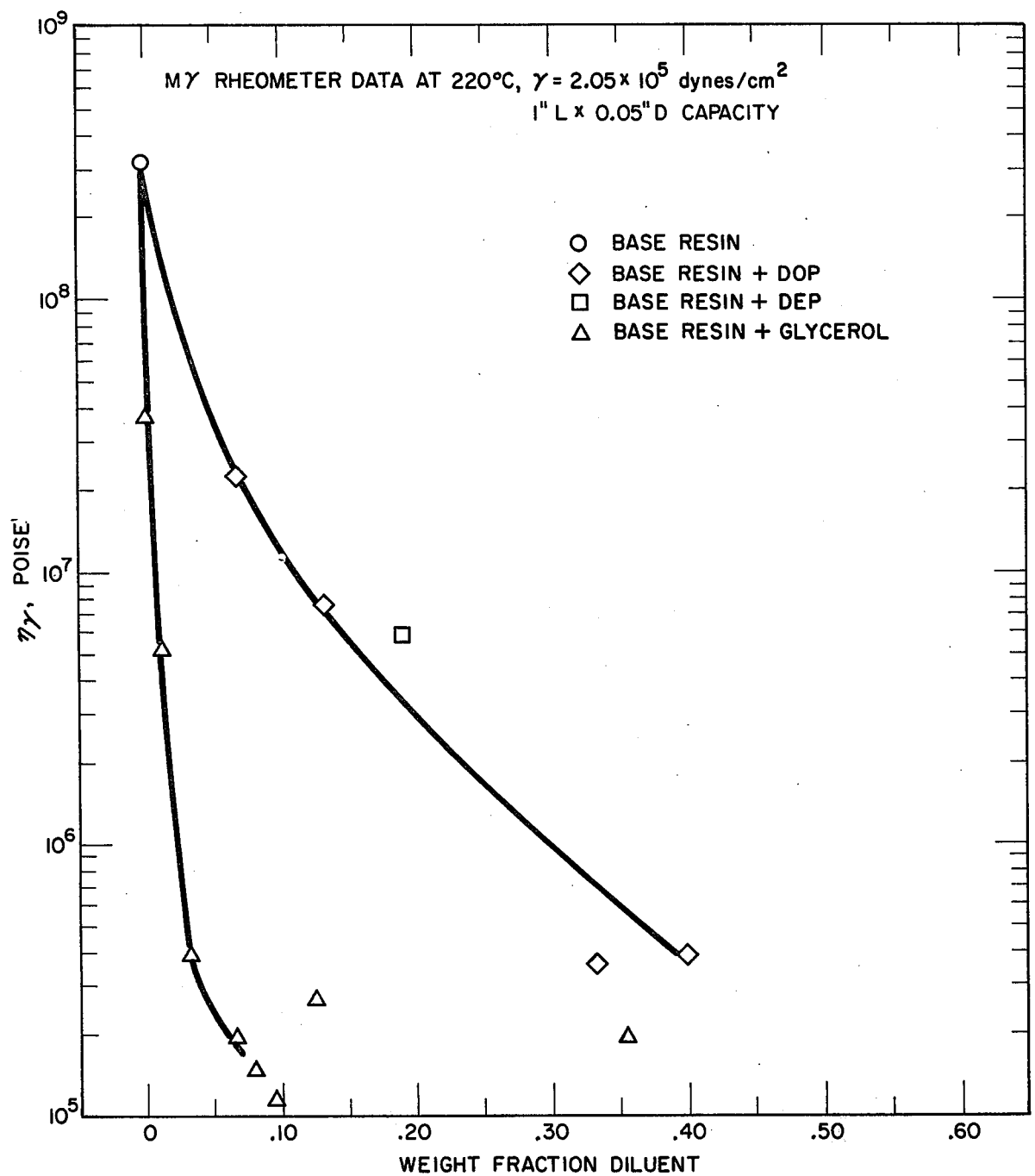

The advantages of the plasticizers of this invention may be more readily appreciated by reference to the following examples.

EXAMPLE 1

Viscosity of Lightly Sulfonated Polystyrene

The bulk viscosity of lightly sulfonated polystyrene (1.78 mole % sulfonate) was determined in a Melt Index Rheometer under conditions of contant shear stress ($\tau = 2.05 \times 10^5$ dynes/cm$^2$) at 220°C. using a capillary having the dimensions of 1.0 length × 0.05 inch diameter. This viscosity obtained under these conditions is extremely high ($3.2 \times 10^9$ poise). Attempts to compression mold this material even at temperatures as high as 250°C. (conditions: 250°C., 10,000 psi pressure, 4' molding time) were not successful because the poor flow characteristics led to incomplete filling of the mold cavity. For comparison the viscosity of a sample of commercial polystyrene (such as Styron was found to be about $4 \times 10^3$ poise at 250°C. This material was compression molded successfully at temperatures of ~ 150°C. The very high melt viscosity observed for the sulfonated polystyrene even at very high temperatures renders the conventional fabrication of this material impractical.

EXAMPLE 2

The Effect of Diluent (Plasticizer) on the Viscosity Behavior of Sodium Salts of Lightly Sulfonated Polystyrene (Sodium Salt)

The effect of diluents on polymer viscosity has been well explored in the open literature. The viscosity of conventional polymers is lowered by the incorporation of a diluent; this is assumed to arise as a result of the increase in free volume and from the decrease in polymer segment concentration due to dilution. This increase in free volume is accompanied by a depression in the glass transition temperature of the mixture. Based on these concepts, it is possible through theory to predict the amount of viscosity lowering achieved by adding a diluent to a given polymer. It has been demonstrated for a number of systems (including polystyrene-diethyl benzene) that theory and experiment are in excellent agreement [cf Bueche and Kelly, J. Polymer Sci. 50,549 (1961)].

Such experiments in the prior art demonstrate conclusively that the use of plasticizers to lower polymer viscosity is well known and very predictable. However, in the case of ionically crosslinked polymers, such as sodium salts of lightly sulfonated polystyrene, there is an additional complicating feature due to the interactions between the sodium sulfonate groups on different molecules. As seen in Example 1, the presence of such interactions has a dramatic effect on the product melt viscosity, virtually precluding practical fabrication procedures. Conventional plasticizers such as those known in the art would be presumed to have little effect on these ionic interactions. However, we shall demonstrate that there is a second class of plasticizers which act primarily on these ionic interactions or possibly on both ionic interactions and also on the polymer backbone.

Thus, we can define two classes of plasticizers; (1) those known in the prior art where a viscosity depression arises from free volume effects and the reduction in polymer segment density which we designate as "backbone plasticizers"; and (2) those which operate, in an ideal sense, only by destroying or diminishing the inter-chain associations resulting from the presence of ionic groups in the polymer chain. This latter class of plasticizers will be referred to as "preferential plasticizers". It is readily apparent that "preferential plasticizers" provide a much more effective means of viscosity depression for ionomers than would "backbone plasticizers". We shall also demonstrate that some diluents will display a behavior characteristic of both classes of plasticizers.

As a representative of the class of backbone plasticizers dioctyl phthalate (DOP) was employed. As a member of the new preferential plasticizers for ionic polymers, glycerol was employed. Both systems were studied with sulfonated polystyrene (sodium salt) as the base polymer. The base resin employed in these studies had a $SO_3Na$ content of 1.78 mole %. Various quantities of the above two diluents were added to this resin by a solution technique (involving dissolution in benzene-methanol mixtures of both polymer and plasticizer) followed by room temperature evaporation of the solvent, and final drying of the polymer-diluent mixtures at 80°C. under vacuum. It was also found that the polymer diluent (plasticizer) mixtures could be prepared by direct addition of the liquid diluent to the powdered base resin.

The results of viscosity measurements made at 220°C. on these polymer-diluent mixtures are shown in FIG. 1 where the viscosity measured at a constant shear stress of $2 \times 10^5$ dynes/cm$^2$ is plotted against the weight fraction of the diluent as added to the base resin. It may be seen that the viscosity for the base resin is extremely high ($3.2 \times 10^8$ poise). Upon the addition of DOP the viscosity is seen to drop off, reaching a level of about $4 \times 10^5$ poise at 40 wt. % DOP. In contrast, only 3.5 wt. % glycerol is required to drop the viscosity to the same extent. Although glycerol is very effective in reducing the viscosity of the base resin, its effect terminates in the vicinity of about 10 wt. %, presumably due to incompatibility of glycerol with the polymer above this level.

These data are presented in tabular form in Table I. The last two columns of that table provide the viscosity values predicted from theory and those observed experimentally for the two types of plasticizers investigated. In the case of DOP, it is evident that the measured viscosity values are close to the predicted values. This is in accord with the concept that this plasticizer is acting in a very conventional manner. As expected, the measured glass transition of the DOP mixture decreases dramatically as DOP content increases, again consistent with the viscosity behavior.

In the case of the glycerol mixtures, the experimentally measured viscosity values are dramatically different from those predicted, and lower by factors of 5 to 200 fold. At about 9.5 wt. % glycerol, the measured viscosity is about 1/3000 that of the base resin. Clearly, this behavior is different from that of a conventional plasticizer such as DOP and not in accord with published theory. The viscosity values with this system are in a range which permits compression molding and extrusion at moderate rates. It is to be emphasized that this reduction in viscosity is achieved without a concomitant decrease in the glass transition; this is a very desirable objective for selected applications requiring high softening rigid materials.

Table II provides a similar comparison of the effect of DOP and glycerol at a higher temperature of 250°C. Under these conditions the same general trends apply as above except that the melt viscosities are lower due to the higher temperature.

Figure 2:
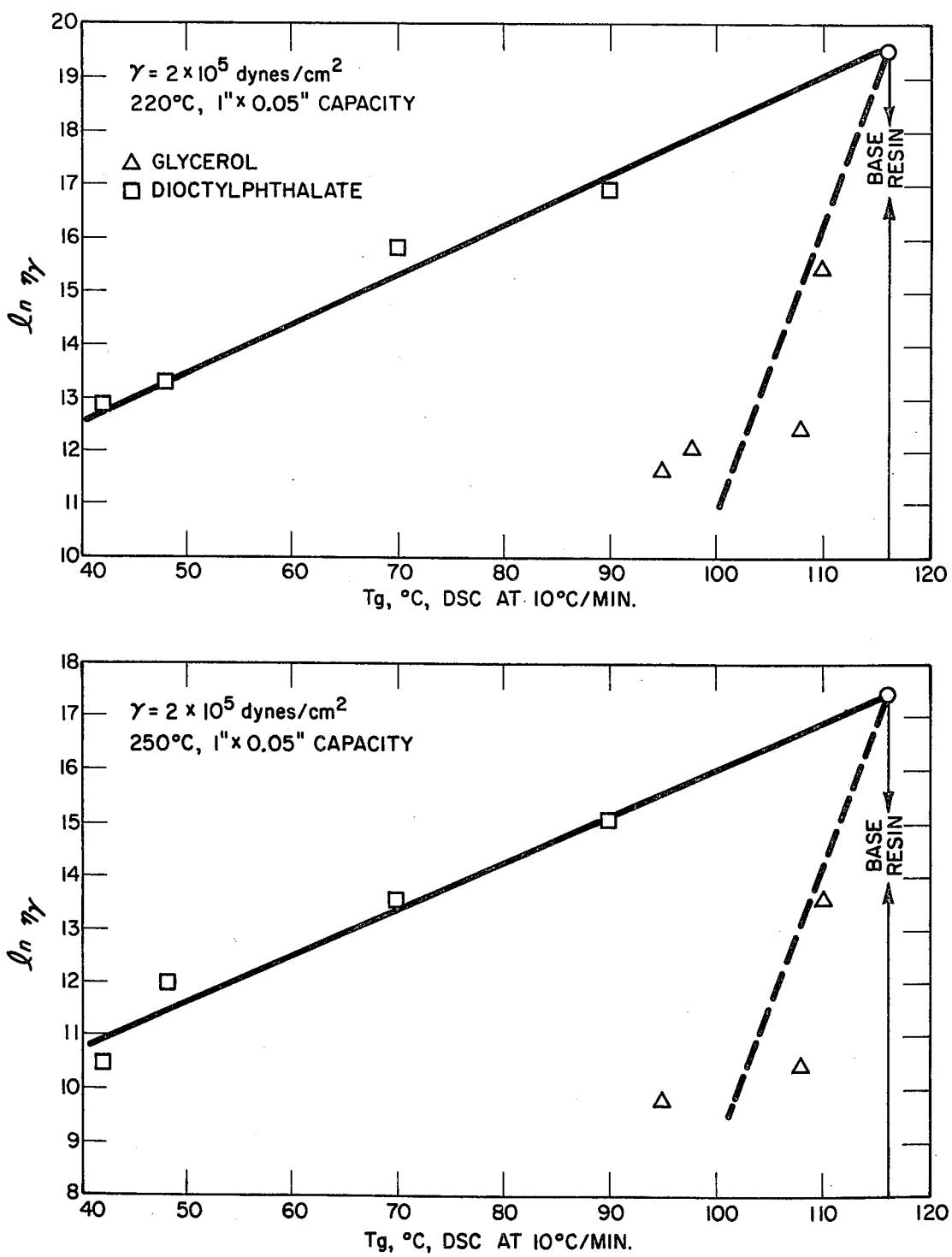
FIG. 2 illustrates the difference between the two classes of plasticizers on ionomer melt viscosity; one which primarily plasticizes the backbone and one which primarily plasticizes the ionic groups at temperatures of 220° and 250°C.

FIG. 2 shows viscosity values plotted as a function of the glass transition temperature, as measured by DSC at 10°C/min. Viscosity data taken at both 220° and 250°C. are included on this figure. It may be seen that the log (viscosity) decreases in direct proportion with the decrease in $T_g$ for polymer-DOP mixtures. The viscosity drop for polymer-glycerol mixtures is abnormally high, considering the rather small depression in $T_g$. These experiments show again that highly polar plasticizers such as glycerol are very effective in decreasing the melt viscosity of ionic polymers.

Figure 3:
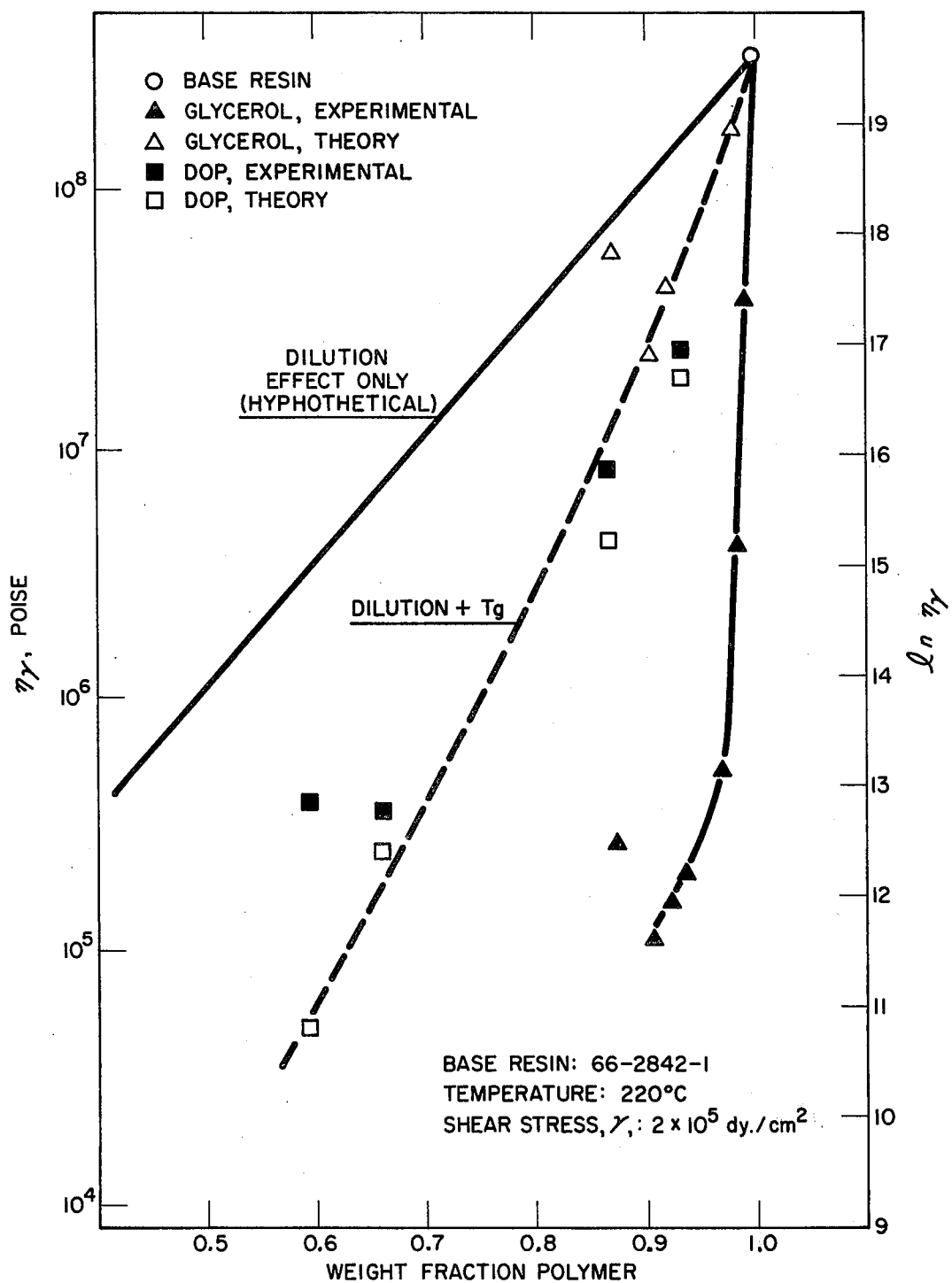
FIG. 3 illustrates the expected influence of plasticizers on ionomer melt viscosity assuming that they act as diluents or backbone plasticizers based on theory and the experimental results of two different types of plasticizers.

Because of the large difference in the effectiveness of DOP and glycerol in reducing the viscosity of the base resin, it was of interest to determine how these data fit the theory for conventional polymer-diluent behavior as discussed above for the experiments of Bueche and Kelly. FIG. 3 gives the results of calculations based on the $T_g$ and composition of the polymer-diluent mixtures. The open points on this plot represent the viscosity predicted from theory (F. Bueche, Physical Properties of Polymers, Interscience 1962, pp. 116–120). The filled points are the experimentally measured viscosity values for each polymerdiluent mixture for which glass transition temperature ($T_g$) was measured. It may be seen that DOP polymer-diluent mixtures closely follow theoretical predictions for conventional polymer-diluent behavior. The polymer-glycerol mixtures, on the other hand, gave viscosity depressions 1 to 2 decades greater than would be predicted by free volume-dilution effects alone. It is clear from these results that we can classify DOP as a "backbone" plasticizer. Glycerol, however, destroys or diminishes the extent of interchain interactions, and the viscosity depression achieved is primarily due to this effect. Glycerol, therefore, is clearly a preferential plasticizer.

Figure 4:
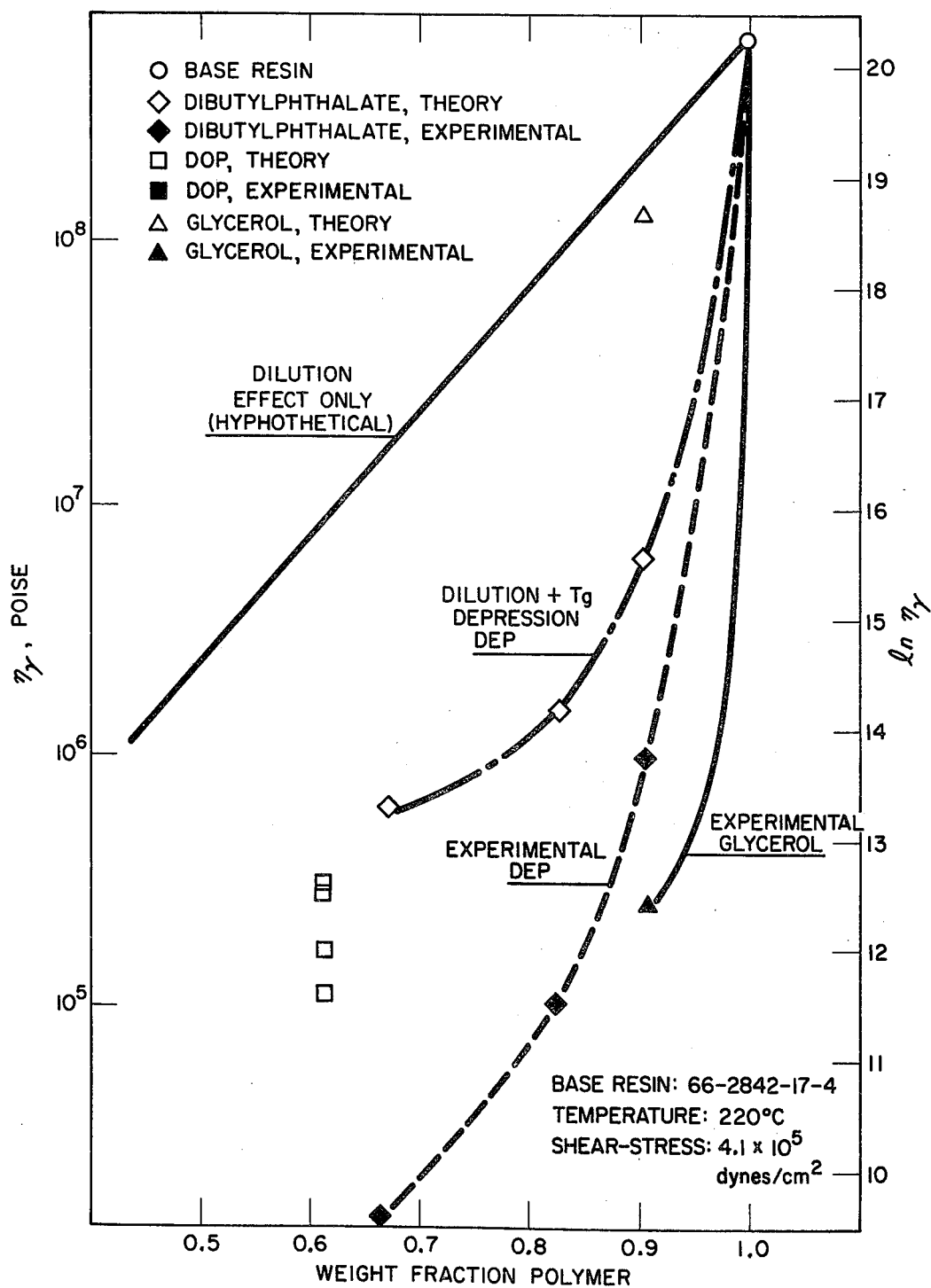
FIG. 4 illustrates the influence of plasticizers on ionomer melt viscosity assuming that such plasticizers act as diluents on backbone plasticizers based on theoretical considerations and the experimental results of three different plasticizers.

FIG. 4 shows data for dibutylphthalate (DBP) as well as for DOP and glycerol plasticized products. The viscosity depression for DBP plasticized products exceeds that predicted from free volume-dilution theory, and leads to large viscosity depressions. Apparently, DBP diminishes inter-chain interactions as well as acting to plasticize the backbone, and does not appear to be limited in its effect with increasing concentration to the same extent as noted for glycerol. Of course, DBP reduces the glass transition of this polymer to a substantial extent and thereby differs from glycerol in this respect.

Tables I–III present the experimental results and theoretical predications on these systems.

These experiments demonstrate conclusively that a selected class of plasticizers provided they are sufficiently polar can dramatically improve the flow characteristics of ionic polymers. Of even greater significance, the viscosity levels are lowered to levels which permit processability under practical conditions such as compression molding, extrusion, or injection molding.

EXAMPLE 3

A sulfonated polystyrene was prepared which contained 2.83 sulfonic acid groups per 100 monomer

TABLE I

EXPERIMENTAL AND PREDICTED VISCOSITY RATIOS FOR POLYSTYRENE SODIUM SULFONATE — DILUENT MIXTURES AT 220°C. and $\tau = 2 \times 10^5$ DYNES/CM$^2$
Base Resin: 1.78 mole % SO$_3$Na

| Diluent | Wt. Fraction Polymer | Volume Fraction Polymer at 220°C. | $T_g$ [4] °C. | $\eta$ Predicted Poise | $\eta$ Experimental Poise |
|---|---|---|---|---|---|
| None | 1.0000 | 1.0000 | 116 | — | $3.2 \times 10^8$ [5] |
| DOP (1) | 0.9330 | 0.9248 | 90 | $1.8 \times 10^7$ | $2.3 \times 10^7$ |
| DOP (2) | 0.8100 | 0.7903 | 81 | $4.1 \times 10^6$ | $5.8 \times 10^6$ |
| DOP (1) | 0.8665 | 0.8516 | 70 | $4.2 \times 10^6$ | $7.7 \times 10^6$ |
| DOP (1) | 0.6666 (3) | 0.6381 | 48 | $2.5 \times 10^5$ | $3.5 \times 10^5$ |
| DOP (1) | 0.5995 (3) | 0.5696 | 42 | $4.9 \times 10^4$ | $3.8 \times 10^5$ |
| Glycerol (1) | 0.9843 | 0.9859 | 110 | $1.7 \times 10^8$ | $3.9 \times 10^6$ |
| Glycerol (1) | 0.9220 | 0.9295 | 98 | $4.1 \times 10^7$ | $1.5 \times 10^5$ |
| Glycerol (1) | 0.9050 | 0.9140 | 90 | $2.2 \times 10^7$ | $1.1 \times 10^5$ |
| Glycerol (1) | 0.8740 | 0.8856 | 108 | $5.3 \times 10^7$ | $2.6 \times 10^5$ |

(1) Mixture prepared by dissolving both diluent and polymer in Benzene-MeOH followed by evaporation.
(2) Mixture prepared by adding diluent directly to polymer crumbs and blending.
(3) Diluent lost during drying at 80°C. in vacuum oven, composition uncertain.
(4) $T_g$ measured by DSC at 10°C. per min.
(5) Calculated value from $\eta^o$ at 250°C. using $E_{vis.} = 36,800$ cal./mole.

TABLE II

EXPERIMENTAL AND PREDICTED VISCOSITY RATIOS FOR POLYSTYRENE SODIUM SULFONATE — AT 250°C. and $\tau = 2 \times 10^5$ DYNES/CM$^2$
Base Resin: 1.78 mole % SO$_3$Na

| Diluent | Wt. Fraction Polymer | Volume Fraction Polymer at 250°C. | Tg [4] °C. | $\eta$ Predicted Poise | $\eta$ Experimental Poise |
|---|---|---|---|---|---|
| None | 1.0000 | 1.0000 | 116 | — | $3.8 \times 10^7$ |
| DOP (1) | 0.9330 | 0.9242 | 90 | $5.0 \times 10^6$ | $3.3 \times 10^6$ |
| DOP (2) | 0.8100 | 0.7887 | 81 | $1.0 \times 10^6$ | — |
| DOP (1) | 0.8665 | 0.8503 | 70 | $1.2 \times 10^6$ | $7.8 \times 10^5$ |
| DOP (1) | 0.6666 (3) | 0.6358 | 48 | $9.4 \times 10^4$ | $1.6 \times 10^5$ |
| DOP (1) | 0.5995 (3) | 0.5672 | 42 | $4.2 \times 10^4$ | $3.6 \times 10^4$ |
| Glycerol (1) | 0.9843 | 0.9858 | 110 | $2.4 \times 10^7$ | $7.8 \times 10^5$ |
| Glycerol (1) | 0.9220 | 0.9289 | 98 | $7.4 \times 10^6$ | — |
| Glycerol (1) | 0.9050 | 0.9132 | 90 | $4.5 \times 10^6$ | $1.8 \times 10^4$ |
| Glycerol (1) | 0.8740 | 0.8846 | 108 | $8.0 \times 10^6$ | $3.4 \times 10^4$ |

(1) Mixture prepared by dissolving both diluent and polymer in Benzene-MeOH followed by evaporation.
(2) Mixture prepared by adding diluent directly to polymer crumbs and blending.
(3) Diluent lost during drying at 80°C. in vacuum oven - composition uncertain.
(4) Tg measured by DSC at 10°C. per min.

TABLE III

EXPERIMENTAL AND PREDICTED VISCOSITY RATIOS FOR POLYSTYRENE SODIUM SULFONATE — DILUENT MIXTURES AT 220°C. AND $\tau = 4.1 \times 10^5$ DYNES/CM$^2$
Base Resin: 1.48 mole % SO$_3$Na

| Diluent | Wt. Fraction Polymer | Volume Fraction Polymer at 220°C. | Tg [4] °C. | Predicted, Poise | Measured, Poise |
|---|---|---|---|---|---|
| None | 1.0000 | 1.0000 | 116 | — | $6.4 \times 10^8$ [3] |
| DOP (1) | 0.7143 | 0.6885 | −7.5 | $1.8 \times 10^5$ | $1.6 \times 10^5$ |
| DOP (2) | 0.7143 | 0.6885 | −11.0 | $1.7 \times 10^5$ | $1.1 \times 10^5$ |
| DBP (2) | 0.7692 | 0.7545 | 20 | $6.1 \times 10^5$ | $1.4 \times 10^4$ |
| CBP (2) | 0.8333 | 0.8217 | 31 | $1.5 \times 10^6$ | $1.0 \times 10^5$ |
| DBP (2) | 0.9090 | 0.9020 | 52 | $6.0 \times 10^6$ | $9.4 \times 10^5$ |
| Glycerol (1) | 0.9091 | 0.9178 | 106 | $1.3 \times 10^8$ | $2.5 \times 10^5$ |

(1) Mixture prepared by dissolving both diluent and polymer in Benzene-MeOH followed by evaporation.
(2) Mixture prepared by adding diluent directly to polymer, blending, and cold milling.
(3) Calculated value from $\eta^o$ at 250°C. using Evis.=36,800 cal./mole.

repeat units (0.85 weight % sulfur). A barium salt of this material was prepared as follows:

To prepare the barium salt, a solution of 0.993 N barium acetate in 50-50 water-ethanol by volume was used. A solution of 80 g. of the sulfonated polystyrene in 700 ml. benzene-20 ml. ethanol was treated with 22.2 ml. of 0.993 N barium acetate (22.06 meq.). The resultant solution was cloudy and very thick. The barium sulfonated polystyrene was isolated by steam stripping, washed with water and methanol in a Waring blender, filtered and dried in a vacuum oven. The polymer analyzed 0.82 weight % sulfur, corresponding to 2.73 barium sulfonate groups per 100 monomer units.

This polymer was plasticized with dioctyl phthalate at a level of 100, 75, and 50 parts plasticizer per 100 parts of polymer. In the same manner, this polymer was plasticized with a plasticizer mixture (95 parts of dioctyl phthalate +5 parts of N-ethyl toluene sulfonamide). The level of this combination plasticizer was again employed at 100, 75, and 50 parts total per 100 parts by polymer. The plasticized compositions were compression molded; it appeared that those containing the N-ethyl toluene sulfonamide fluxed more readily than those just containing DOP.

The tensile properties of the samples are shown in Table IV.

TABLE IV

| Plasticizer | Parts Plasticizer Per 100 Parts Polymer | Physical Properties At Break Tensile Strength | Elongation |
|---|---|---|---|
| DOP (95) + ETS (5) | 100 | 703 | 410 |
| DOP (95) + ETS (5) | 75 | 1007 | 235 |
| DOP (95) + ETS (5) | 50 | 2025 | 213 |
| DOP | 100 | 565 | 600 |
| DOP 1 | 75 | 685 | 480 |
| DOP | 50 | 1196 | 280 |

The tensile data show that not only do the compositions containing a small amount of non-volatile domain plasticizer process more readily but result in molded materials with superior proerties. These improved properties most probably are the result of better flow properties during processing.

EXAMPLE 4

The following example demonstrates the viscosity depression the preferred plasticizers of this invention exert on an ionically crosslinked elastomer. Five parts of glycerol were incorporated into 100 parts of a low molecular weight butyl rubber containing 4 mole % barium sulfonate appended thereto. In the absence of any plasticizer, this ionic elastomer exhibited the following viscosities at the indicated temperatures:

| Temperatures, °C. | Melt Viscosity, poise |
|---|---|
| 200° | $1.3 \times 10^9$ |
| 220 | $4.2 \times 10^7$ |
| 250 | $5.2 \times 10^6$ |

These viscosities clearly are too high to permit any reasonable fabrication process to be employed with such materials at temperatures which can be practically achieved without substantial polymer degradation (<225°C.).

The incorporation of 5 parts of glycerol per 100 of this same ionic polymer provides the following viscosity levels at the cited shear stress/shear rate conditions:

| Plasticizer | Temp. | Shear Stress | Shear Rate | Visc. (poise) |
|---|---|---|---|---|
| glycerol | 190°C | 111,172 | 19.1 | $5.8 \times 10^3$ |
| glycerol | 190°C | 282,429 | 64.6 | $4.4 \times 10^3$ |
| glycerol | 190°C | 410,204 | 103.1 | $4 \times 10^3$ |

It is to be emphaszied that the inclusion of 5 parts of glycerol in 100 parts of polymer provided a decrease in the melt viscosity from $1.3 \times 10^9$ poise at 200°C. to about $5 \times 10^3$ poise at 190°C.

The data presented in the above examples show that some materials are effective as plasticizers for the ionic associations in ionic polymers whereas others are not. Those which are effective have solubility parameters of at least 9.0. We can summarize the results from the above examples in tabular form as follows:

TABLE V

Comparison of Various Plasticizers and Their Effectiveness on Depressing Melt Viscosity of Ionic Polymers Beyond Simple Diluent Effects

| Plasticizer | Solubility Parameter | Effective in Reducing Melt Visc. of Ionomers |
|---|---|---|
| Dioctyl Phthalate | 7.9 | No |
| Dibutyl Phthalate | 9.3 | Yes |
| N-ethyl toluene sulfonamide | 11.9 | Yes |
| Glycerol | 16.5 | Yes |

EXAMPLE 5

Plasticization of S-PS With Plasticizers of Varying Solubility Parameter

A sample of sulfonated polystyrene estimated to have a sulfonate content of about 4.5 mole percent sulfonate; barium salt (2.43 weight percent barium by analysis) was employed in these studies. This polymer was dissolved with a series of plasticizers at levels of 50, 75 and 100 parts plasticizer per 100 parts polymer in a mixture of methanolbenzene (10-90). The resultant thick gel was blended by use of a spatula, and the solvent removed in a vacuum oven at 50°C. for a period of from 4 hours to 16 hours. Then each sample was pressed between flat plates at 400°F. several times to further homogenize the products. Finally, each sample was then pressed at 400°F. for 1 minute at a press pressure of 10 tons. The appearance of the pads was then compared as in Table VI.

TABLE VI

COMPARISON OF VARIOUS PLASTICIZERS AT VARIOUS LEVELS AND THEIR INFLUENCE ON MOLDING OF S-PS

| Plasticizer | Dioctyl Phthalate(DOP) | Dihexyl Phthalate(DHP) | Dibutyl Phthalate(DBP) | Diethyl Phthalate(DEP) |
|---|---|---|---|---|
| Solubility Parameter | 7.9 | 8.9 | 9.3 | 10.0 |
| Parts Plasticizer per 100 parts S-PS | | | | |
| 100 | Shriveled, lumpy slippery. | Smooth, shrunk slippery | Smooth, flat, even pad, very flexible | Smooth, flat, even pad |
|  | Gauge=.029 ± .002 | Gauge=.029 ± .002 | Gauge=.020 ± .002 | Gauge=.020 ± .002 |
| 75 | Shriveled, curls, thick, tough, little lumpy | Smooth, shrunk, thick, tough, curls | Smooth, slightly curly on edges | Smooth, flat, even and very slight curling on edges |
|  | Gauge=.037 ± .002 | Gauge=.034 ± .003 | Gauge=.023 | Gauge=.022 |
| 50 | Shrunk, curls, thick, stiff | Shrunk, curls, thick, stiff | Smooth, slightly curly on edge, flexible, stiff | Slight shrinkage, slightly curly |
|  | Gauge=.033 ± .002 | Gauge=.031 | Gauge=.022 ± .001 | Gauge=.025 ± .002 |

The observations in Table VI can be utilized to compare the efficacy of the various plasticizers employed. It is quite apparent that those materials based on dioctylphthalate and dihexyl phthalate result in compression molded pads which are shrunken and shriveled. This behavior is a consequence of the memory which persists in the molten polymer even at 400°F. In the case of dibutyl phthalate and diethyl phthalate a much smoother and flatter compression molded pad results. A more quantitative assessment of this behavior is possible by measurement of the thickness of the molded pads, as given in gauge thickness. It is quite apparent that those pads based on DOP and DHP are considerably thicker than those from DBP to DEP. In the former case, the very high melt viscosity even at 400°F. does not permit sufficient flow to create a smooth thin pad upon release of the pressures involved. It was observed with both DOP and DHP that those samples shriveled (i.e. became thick upon pressure release). In the case of DEP and DBP the greater polarity of these plasticizers and resulting efficiency from dissociating the ionic association permit a much greater ease of processing. From these experiments and others we can state conclusively that those plasticizers with solubility parameter equal to or greater than 9.0 are desirable in this invention. Those plasticizers with solubility parameter less than 9.0 do not have the effectiveness desired and are not within the scope of this invention.

What is claimed is:

1. A composition of matter comprising an ionically crosslinked polymer in combination with from about 0.2 to 50 parts per hundred parts ionically crosslinked polymer of a preferential plasticizer wherein said plasticizer is a normally liquid, non-volatile compound having a solubility parameter of at least nine, a boiling point of at least 150°C, and containing functional groups exhibiting a bond moment of at least 0.6 Debye, wherein the ionically crosslinked polymer is a sulfonated polymer.

2. The composition of claim 1 wherein the sulfonated polymer is an elastomer.

3. The composition of claim 2 wherein the elastomer is butyl rubber, EPDM, polybutadiene, polyisoprene, SBR or natural rubber.

4. The composition of claim 1 wherein the sulfonated polymer is a thermoplastic polymer.

5. The composition of claim 4 wherein the thermoplastic polymer is polystyrene, poly-t-butylstyrene or a copolymer of styrene and t-butylstyrene.

6. The composition of claim 1 wherein said preferential plasticizer is glycerol, ethylene glycol, butanediol, dibutyl phthalate, dipropyl phthalate, hexamethyl phosphoramide or N-ethyl toluene sulfonamide.

7. The composition of claim 1 wherein the polymer is a sulfonated EPDM and the plasticizer is glycerol or N-ethyl toluene sulfonamide.

8. The composition of claim 1 wherein the polymer is a sulfonated polystyrene and the plasticizer is glycerol or N-ethyltoluene sulfonamide.

9. A method for improving the processability of an ionically crosslinked polymer which comprises dispersing in said polymer from about 0.2 to 50 parts per hundred parts ionically crosslinked polymer of a preferential plasticizer wherein said plasticizer is a normally liquid non-volatile compound having a solubility parameter of at least 9, a boiling point at least 150°C, and containing functional groups exhibiting a bond moment of at least 0.6 Debye, wherein the ionically crosslinked polymer is a sulfonated polymer.

10. The method of claim 9 wherein the plasticizer is glycerol or N-ethyl toluene sulfonamide.

11. The composition of claim 1 wherein the plasticizer has a solubility parameter of at least 10.

12. The method of claim 9 wherein the plasticizer has a solubility parameter of at least 10.

13. The composition of claim 1 wherein the polymer contains about 0.2 to about 10 mole % sulfonate.

14. The composition of claim 13 wherein the polymer contains about 0.5 to about 6 mole % sulfonate.

15. The composition of claim 14 wherein the polymer contains about 1.0 to about 4.0 mole % sulfonate.

16. The composition of claim 1 wherein the preferential plasticizer is, a glycol, a triol or a sulfonamide.

17. The composition of claim 1 wherein said preferential plasticizer is a glycol or a triol.

18. The method of claim 9 wherein said preferential plasticizer is a glycol or a triol.

* * * * *